C. R. UNDERHILL.
CONTROLLING MECHANISM.
APPLICATION FILED JAN. 13, 1917.
1,395,066.
Patented Oct. 25, 1921.
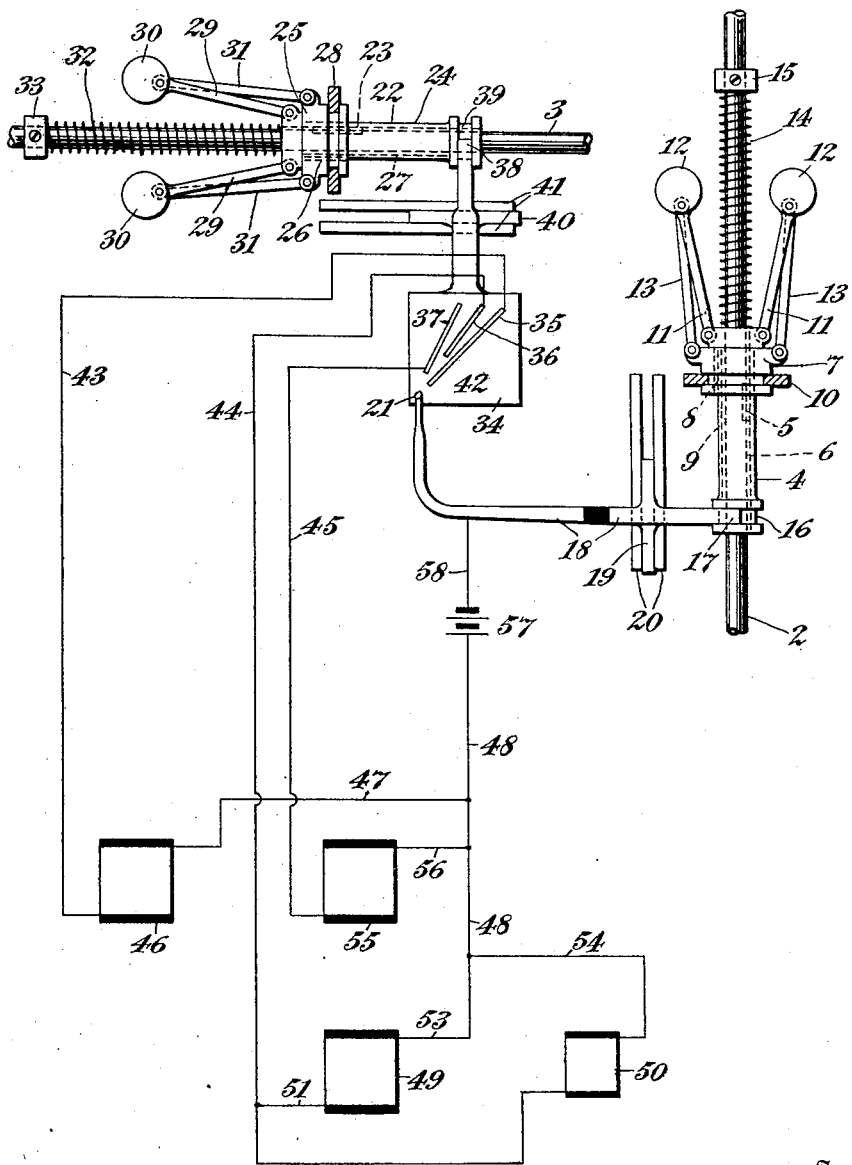

UNITED STATES PATENT OFFICE.

CHARLES R. UNDERHILL, OF NEW HAVEN, CONNECTICUT.

CONTROLLING MECHANISM.

1,395,066.  Specification of Letters Patent.  Patented Oct. 25, 1921.

Application filed January 13, 1917. Serial No. 142,192.

*To all whom it may concern:*

Be it known that I, CHARLES R. UNDERHILL, a citizen of the United States, and resident of New Haven, in the county of New Haven and State of Connecticut, have invented certain new and useful Controlling Mechanism, of which the following is a specification.

This invention relates to controlling mechanism, and its main object is to provide an improved controlling mechanism for governing operated devices.

My improved controlling mechanism operates in connection with two moving members which are effective to bring a device or devices into operation on the attainment of a predetermined speed ratio between the said moving members.

It is especially adapted for such operation in connection with two rotating members, such as two revolving shafts to which my improved controlling mechanism is adapted to be attached, for the purpose of operating one or more devices on reaching a given speed relation between the two shafts.

This type of my improved controlling mechanism embodies a member attached to a revolving shaft and capable of moving to and fro in correspondence with speed changes in the shaft, and in comparing the speed ratios of two shafts I prefer to employ one such member for each shaft which I join to suitable means for operating the power device or other mechanism to be controlled.

Any suitable means can be employed for the last-mentioned operation, but I usually prefer to employ electrical means, especially if the devices to be controlled are not very near together.

The means I employ for attaining the above objects and other advantageous results connected with my improved controlling mechanism are illustrated in the accompanying drawing, which is a diagram illustrating the invention connected with two shafts which are adapted to be rotated at the same speed or different speeds, and the said mechanism is connected electrically to one or more devices or sets of devices which are to be operated.

In the drawing the numerals 2 and 3 designate the two shafts adapted to be rotated, and they are connected to suitable driving means, not shown, but which allow the shafts to be rotated at different speeds.

Mounted on the shaft 2 is a sleeve 4 which is rotatively connected therewith by means of a short key 5 in the shaft and a spline 6 in the sleeve. Mounted on the sleeve 4 is a collar 7 which is rotatively connected to the same by means of a key 8 and a spline 9. A fixed member 10 is placed in an annular groove in the collar 7 and holds it from lateral movement.

Levers 11 having weights 12 are connected to the end of the sleeve 4, and are also connected to the collar 7 by links 13. A spring 14 rests on top of the sleeve 4 at one end and against a collar 15 at the other end, and tends to return the sleeve to its normal position.

The sleeve 4 is provided with an annular groove 16 in which the forked end 17 of the member 18 engages. The member 18 is provided with a portion 19 arranged to be guided in ways 20 when the said member 18 is moved to and fro by the action of the weights 12, lever 11, and sleeve 4. The left hand part of the member 18 is insulated from the other portions and the end portion is turned up at right angles to the remaining portion and provided with a contact member 21.

Mounted on the shaft 3 is a sleeve 22, connected to the shaft through the medium of a key 23 working in a spline 24 in the sleeve, and mounted on the left hand end of the sleeve 22 is a collar 25, connected to the sleeve by a key 26 working in a spline 27. A fixed member 28 placed in an annular groove in the collar 25 prevents lateral movement of the collar.

Connected to the sleeve 22 are two levers 29 provided with weights 30, and the levers are connected by links 31 to the collar 25. A helical spring 32 which abuts against the left hand end of the sleeve 22 at one end, and at the other against a collar 33 secured to the shaft 3, keeps the sleeve 22 in its normal position.

A contact plate 34, provided with a plurality of contact strips 35, 36 and 37, inclined to one another, is joined to a portion extending upward and terminating in a forked end 38. The forked end 38 engages with an annular groove 39 in the sleeve 22 and is movable to and fro with the sleeve, guided by a portion 40 in ways 41.

The contact strips 35, 36 and 37 are separated from each other by insulation 42, and connected to conductors 43, 44 and 45 respectively. The conductor 43 is connected to one end of the winding of a member to be operated such as the electro-magnet 46 which is joined by a conductor 47 to the common conductor 48. The conductor 44 is connected to the windings of other members to be operated, such as the electro-magnets 49 and 50, by means of the conductors 51 and 52, the said electro-magnets 49 and 50 being joined by conductors 53 and 54, to the common conductor 48. The conductor 45 is joined to still another member to be operated, which is an electro-magnet designated by the numeral 55, and which electro-magnet is joined by a conductor 56 to the common conductor 48. The conductor 48 is joined to the negative terminal of a source of electrical supply, such as the battery 57, the positive terminal of which is joined by a conductor 58 to the insulated portion of the member 18.

The operation of my improved controlling mechanism is as follows:

The shafts 2 and 3 are rotated by their driving means which may be arranged to operate them at different speeds and for varying the speed as desired. The governor comprised by the revolving weights 12, levers 11, and links 13 causes the sleeve 4, member 18 and contact 21 to take given positions for each speed of the shaft 2. And in like manner the governor comprised by the levers 29, weights 30 and links 31 causes the sleeve 22 and contact plate 34 connected therewith to also take up given positions for given speeds of the shaft 3.

When the speeds of the shafts 2 and 3 are in a given ratio, as for instance 1 to 1, 1½ to 1, 2 to 1, etc., the contact plate 34 will move to a position at which the contact member 21 will touch one of the inclined contact strips 35, 36 or 37, and electric circuits will be closed thereby. If for example the contact member 21 touches the strip 35, a circuit will be closed and current will flow from positive terminal of the battery 57, by way of conductor 58, member 18, contact 21, strip 35, conductor 43, electro-magnet 46, conductors 47 and 48 to the negative terminal of the battery 57. The electro-magnet 46 will therefore be energized when the shafts are running in this speed ratio.

In like manner the centrifugal governors, as the speed ratio of the shafts 2 and 3 increases, will bring the contact 21 to touch the strip 36, closing the circuit containing the electro-magnets 49 and 50, where a plurality of members are operated by means of a single strip on the member 34. The electro-magnets 49 and 50 may operate mechanical parts (not shown) in unison or in different timing as desired and arranged for by suitable winding of their coils.

The third contact strip 36 will be effective when a still greater speed ratio is reached between the shafts 2 and 3.

What I claim is:—

1. Controlling mechanism embodying the combination with two members moving at variable relative speeds, of mechanism connected therewith which includes two elements movable transversely to each other, effective for controlling a device to be operated on the attainment of predetermined speed ratios between said moving members.

2. Controlling mechanism embodying the combination with two members moving at variable relative speeds, of devices connected therewith which includes two elements movable transversely to each other, effective for controlling a plurality of devices to be operated, each at a different time on the attainment of predetermined speed ratios between said moving members.

3. Controlling mechanism embodying the combination with two shafts rotatable at variable relative speeds, of mechanism connected therewith which includes two elements movable transversely to each other, for controlling a device to be operated on the attainment of a predetermined speed ratio between said shafts.

4. Controlling mechanism embodying the combination with two power shafts adapted to be driven at variable relative speeds, of electric circuit controlling means having two circuit closing elements movable transversely to each other, connected with the respective shafts and jointly operative for closing a circuit on the attainment of a predetermined speed ratio between said shafts.

5. Controlling mechanism embodying the combination with two shafts rotatable at variable relative speeds, of mechanism connected therewith which includes two elements movable transversely to each other, which are effective for automatically controlling a plurality of devices to be operated, each at a different time on the attainment of predetermined speed ratios between said shafts.

6. Controlling mechanism embodying the combination with two power shafts adapted to be driven at the same or different speeds, of electric circuit controlling means having two circuit closing elements movable transversely to each other, connected with the respective shafts and jointly effective for closing a plurality of circuits at different times, each circuit being closed on the attainment of a predetermined speed ratio between said shafts.

7. Controlling mechanism embodying the combination with two shafts rotatable at variable relative speeds, of electric circuit controlling means having two circuit closing elements movable transversely to each other, one element moving in correspondence with speed changes of one shaft and the other in correspondence with speed changes of the other shaft.

8. Controlling mechanism embodying the combination with two shafts rotatable at variable relative speeds, of electric circuit controlling means having two circuit closing elements movable transversely to each other, one element having a plurality of contacts and moving in correspondence with speed changes of one of said shafts and the other having one contact movable in correspondence with speed changes of the other shaft.

9. Controlling mechanism embodying the combination with two shafts rotatable at variable relative speeds, of electric circuit controlling means having two circuit closing elements movable transversely to each other, one element movable in correspondence with speed changes of one shaft and having a plurality of contact strips arranged at different angles, and the other element having one contact movable in correspondence with speed changes of the other shaft.

10. Controlling mechanism embodying the combination with two separately actuated elements, movable transversely to each other, of a rotatable member movable from or toward its axis of rotation in correspondence with changes in rotative speed and connected to one of said elements for imparting movements thereto.

11. Controlling mechanism embodying the combination with two rotatable shafts, and a centrifugal governor on each shaft, of a controlling device having two elements movable transversely to each other, one element operated by one of said governors and the second element operated by the other governor.

12. Controlling mechanism embodying the combination with two rotatable shafts, and a centrifugal governor on each shaft, of electric circuit controlling means having two elements, movable transversely to each other, one element operated by one of said governors and the second element operated by the other governor.

13. Controlling mechanism embodying the combination with electric circuit controlling means, having relatively movable circuit-controlling elements movable transversely to each other, controlling a plurality of circuits, of a rotatable member movable from or toward its axis of rotation in correspondence with changes in rotative speed and connected to one of said elements for imparting movements thereto.

14. Controlling mechanism embodying the combination with electric circuit controlling means, having two circuit-controlling elements each movable transversely to the other, of a rotatable member movable from or toward its axis of rotation in correspondence with changes in rotative speed and connected to one of said elements for imparting movements thereto.

15. Controlling mechanism embodying the combination with electric circuit controlling means having two circuit-controlling elements, movable transversely to each other, one of which embodies a plurality of contacts each connected to a separate circuit, of a rotatable member movable from or toward its axis of rotation in correspondence with speed changes and connected to one of said elements for imparting movements thereto.

16. Controlling mechanism embodying the combination with electric circuit controlling means having two circuit-controlling elements, movable transversely to each other, one of which embodies a plurality of contact strips inclined to one another and each connected to a separate circuit, of a rotatable member movable from or toward its axis of rotation in correspondence with speed changes and connected to one of said elements for imparting movements thereto.

17. Controlling mechanism embodying the combination with an electric circuit controller having two circuit-controlling elements, each movable transversely to the other, and one of which embodies a plurality of contacts each connected to a separate circuit, of two rotatable members each connected to a separate shaft, each member movable from or toward its respective shaft in correspondence with changes in rotative speed and each connected to a separate individual of said circuit controlling elements.

18. Controlling mechanism embodying the combination with an electric circuit controller having two circuit-controlling elements, each movable transversely to the other, and one of which embodies a plurality of contact strips inclined to one another and each connected to a separate circuit, of two rotatable members each connected to a separate shaft, each member movable from or toward its respective shaft in correspondence with changes in rotative speed and each connected to a separate individual of said circuit controlling elements.

Signed at New York, in the county of New York, and State of New York, this 11th day of January, A. D. 1917.

CHARLES R. UNDERHILL.

Witnesses:
W. R. WARNER,
CHAS. D. KING.